Aug. 27, 1957 M. J. LEE 2,804,005
CONTROL FOR POWER LIFT MEANS REGULATING DEPTH
OF TRACTOR PROPELLED IMPLEMENTS
Filed April 29, 1955 2 Sheets-Sheet 1
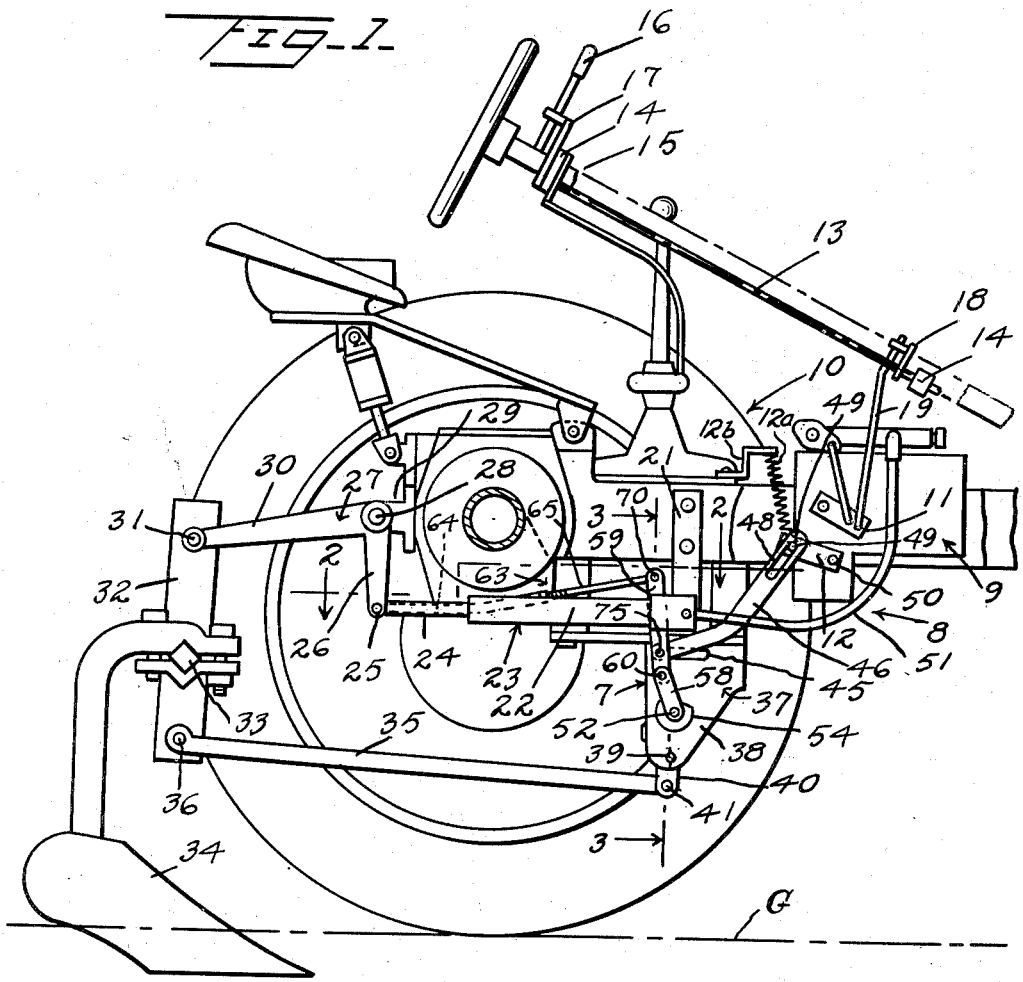
INVENTOR
M. J. Lee
BY John N. Randolph
ATTORNEY

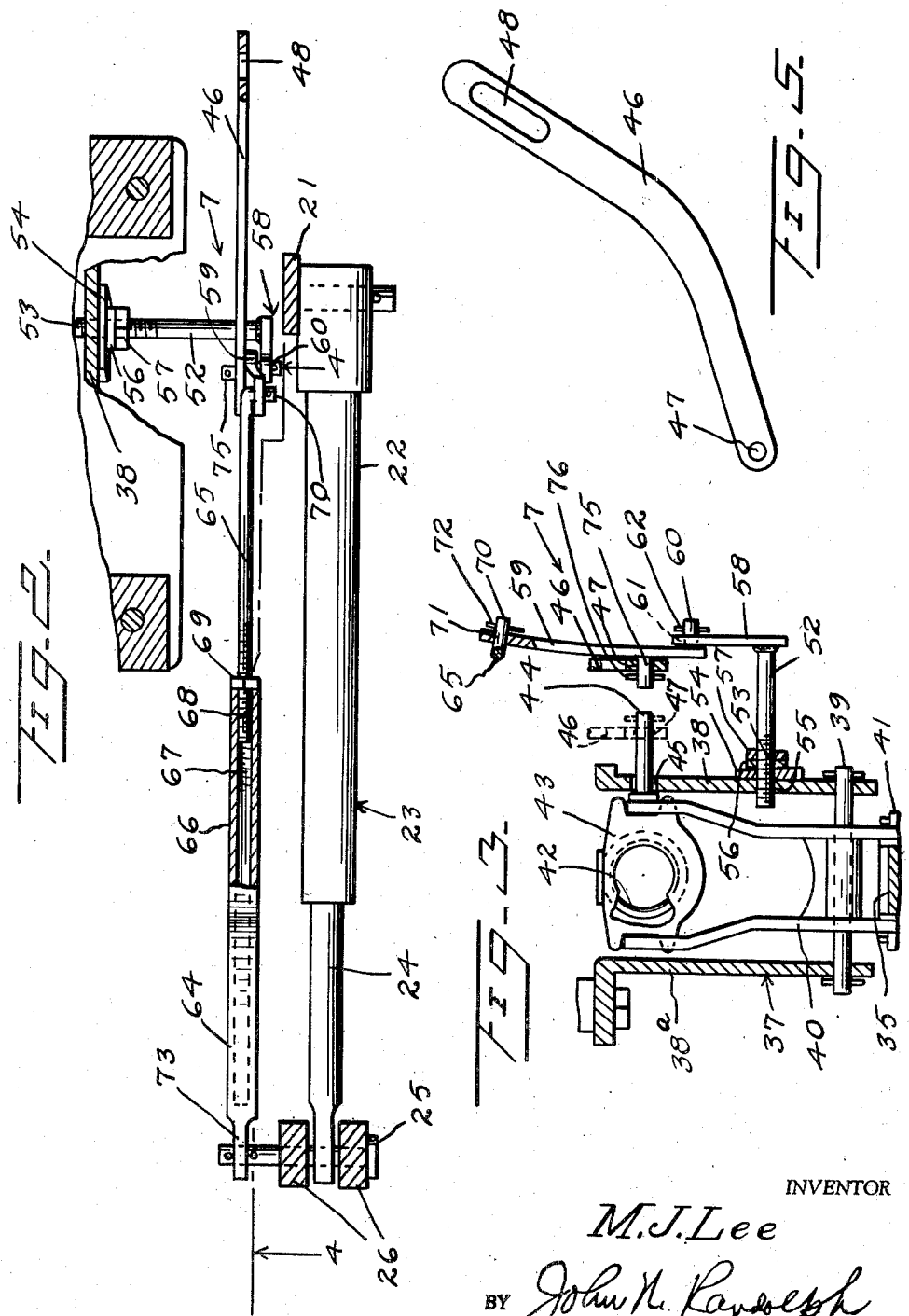

United States Patent Office 2,804,005
Patented Aug. 27, 1957

2,804,005

CONTROL FOR POWER LIFT MEANS REGULATING DEPTH OF TRACTOR PROPELLED IMPLEMENTS

Malcolm J. Lee, Hico, Tex.

Application April 29, 1955, Serial No. 504,803

5 Claims. (Cl. 97—46.07)

This invention relates to a novel attachment for a conventional power lift means for effectively regulating the operating depth of tractor propelled implements, such as plows.

The use of a power lift means involving a hydraulic system whereby the depth of operation of tractor propelled implements such as plows is automatically regulated by the draft of the implements, is well known. However, such units are not completely satisfactory in view of the variation in draft on the implements resulting from differences in the soil in which the implements are operating. It is very common for soil to vary substantially within a small area being traversed by plows or other implements, so that such implements within a matter of a few minutes may be operating in hard tight soil, soft sandy soil and again in hard soil, for example.

With the conventional hydraulic systems as now employed, this results in the implements or plows operating at greater depth in the soft soil than in the hard soil. Accordingly, unless there is almost a constant manual adjustment of the control of the system, implements will not be operating at a desired depth. Furthermore, it is extremely difficult to accurately judge the variations in depth at which the implements are operating so that proper manual adjustment can be made.

Accordingly, it is a primary object of the present invention to provide an improved control attachment for hydraulic power lift systems which may be readily applied to the conventional units and which when employed therewith will insure that the implements will be maintained operating at a desired depth, irrespective of variations in the soil through which the implements operate.

A further object of the invention is to provide such a control attachment which may be readily rendered operative or inoperative at the option of the user.

Other objects and advantages of the invention will hereinafter becomes more fully apparent from the following description of the drawings, illustrating a presently preferred embodiment thereof, and wherein:

Figure 1 is a longitudinal sectional view of the rear portion of a tractor showing the invention in side elevation associated with a conventional hydraulic lift unit for regulating the depth of operation of ground engaging implements;

Figure 2 is an enlarged horizontal sectional view taken substantially along a plane as indicated by the line 2—2 of Figure 1;

Figure 3 is a fragmentary transverse vertical sectional view, on an enlarged scale, taken substantially along a plane as indicated by the line 3—3 of Figure 1;

Figure 4 is a longitudinal sectional view, taken substantially along a plane as indicated by the line 4—4 of Figure 2, and Figure 5 is a side elevational view of one part of the conventional system shown removed.

Referring more specifically to the drawings, the improved control, designated generally 7 and comprising the invention, is shown in an applied and operative position in connection with a conventional hydraulic lift unit, designated generally 8, in Figures 1, 2 and 3.

A substantial part of the conventional hydraulic lift unit 8 has been illustrated and will now be briefly described in order to afford an understanding of the attachment 7 and how it functions with the unit 8. However, it is to be understood that only a sufficient part of the unit 8 has been illustrated and will be described, as is considered necessary to afford an understanding of the attachment 7. The unit 8 includes a hydraulic pump 9 of a conventional type driven by the prime mover of the tractor 10, which prime mover is not shown. The pump 9 includes a pivotally mounted actuating arm 11 and a pivotally mounted control member 12. A shaft 13 is journaled in bearings 14 which are supported by the steering column 15. The upper end of the shaft 13 terminates in a manual control lever 16 which is associated with a quadrant 17 and by which the shaft 13 can be turned in the bearings 14. Said shaft 13 near its lower end is provided with a laterally extending lever or crank arm 18 to which is connected one end of a link 19. The opposite end of the link 19 is pivotally connected to the arm 11. A hanger bracket 21 is secured to and depends from the frame of the tractor 10, rearwardly of the pump 9. The closed end of the cylinder 22 of a hydraulic ram 23 is pivotally mounted for vertical swinging movement on the lower portion of the bracket 21. Said ram has a piston rod 24 extending slidably through its opposite rear end and which is pivotally connected by a fastening 25 to the depending arm 26 of a bell crank 27. The bell crank 27 is fixed to a cross shaft 28 which extends across the rear part of the tractor frame and which is journaled in suitable bearings 29. The other longer arm 30 of the bell crank 27 extends rearwardly from the shaft 28 and is pivotally connected by a fastening 31 at its rear end to a tool bar standard 32 which provides a support or partial support for a tool bar 33 and which is positioned transversely relative to the support 32. One or more ground engaging or cultivating implements 34, such as a plow, only one of which has been shown, is supported by and disposed beneath the tool bar 33. A drawbar 35 is pivotally connected at 36 at its rear end to the lower portion of the standard 32 and extends forwardly therefrom, as seen in Figure 1.

A supporting frame 37 is suitably secured to and depends from the underside of the tractor frame, adjacent the hanger bracket 21, and includes spaced substantially parallel side walls 38 and 38a, as best seen in Figure 3. A pin 39 extends through the side walls near the bottom of the frame 37 for pivotally mounting a fork 40 therein. The fork 40 has a pan 41 extending through the lower part thereof, below the level of its pivot 39, and to which the forward end of the drawbar 35 is pivotally connected. An expansion spring 42 which has a forward end seated in an upper forward part of the frame 37, has a rear end bearing against an upper spring seat portion 43 of the fork 40 and which urges said fork to swing counterclockwise on its pivot 39, as seen in Figure 1, for exerting a forward pull on the drawbar 35. The upper portion of the fork 40 has a laterally extending pin 44 which projects laterally through the side wall 38, which is provided with a longitudinally extending slot 45 for loosely accommodating the pin 44 and which permits swinging movement of the pin, with the upper portion of the fork 40, longitudinally with respect to the tractor 10. The pin 44 is normally connected by a link 46 to the control member 12. Said link has an opening 47, as seen in Figure 3, which normally engages loosely on the pin 44, outwardly with respect to the wall 38, as seen in dotted lines in Figure 3. The other end of the link 46 is provided with a longitudinal slot 48 which slidably and pivotally engages on a pin 49 which projects outwardly from the control member 12, remote from the pivot 50 thereof, as seen in Figure 1. A hose 51 extends from the pump 9 and is connected to the forward closed end of the ram cylinder 22. The parts 9 to 51 of the unit 8 are of conventional construction, as fully disclosed in Patent No. 2,679,199, issued May 25, 1954, to Walter F. Strehlow, and have been illustrated and briefly described herein merely to afford an understanding of the attachment 7, which will hereinafter be described.

In the conventional operation of the system 8, the manual lever 16 is swung downward relatively to the quadrant 17 for actuating the crank arm 18 and link 19, for causing said parts to move downwardly. This causes the arm 11 to swing downwardly. Downward swinging movement of the arm 11 lowers the implement 34 due to the fact that pressure in the forward end of the ram cylinder 22 is thus diminished allowing the bell crank 27 to turn counterclockwise as seen in Figure 1 with the shaft 28, thus permitting the standard 32 to swing downwardly and with it the implement 34. Adjustment of the arm 11 upwardly or downwardly by manual operation of the lever 16 raises and lowers the implement or implements 34 and sets the draft pull but does not control the depth of operation of the implement or implements 34. When the pump arm is displaced downwardly for thus lowering the implements 34 and for setting the draft, the control member 12 is urged to turn in a clockwise direction as seen in Figure 1 but is held against such turning movement by engagement of its pin 49 with the upper end of the slot 48. Movement of the control member 12 in a clockwise direction as seen in Figure 1 will effect a raising of the implements 34, even though the pump arm is set in a lowered position, since the control member 12 if permitted to turn clockwise as seen in Figure 1 will cause the hydraulic medium under pressure to be supplied by the pump 9 to the ram cylinder 22 through the hose 51. A pull spring 12a, not disclosed in Patent No. 2,679,199, but now conventionally employed, is anchored to a bracket 12b and connected to control arm 12. Spring 12a urges the arm 12 to swing upwardly or clockwise as seen in Figure 1, to eliminate lost motion by retaining the pin 49 in the outer end of slot 48, to cause the unit to be more quickly responsive to a change in the draft.

Assuming that the tractor 10 is moving from left to right as seen in Figure 1, with the implements 34 positioned to operate below the ground level G, the resistance of the implements 34 to movement through the ground will tend to cause the standard 32 to swing upwardly and rearwardly or clockwise as seen in Figure 1 about its pivot 31. This will exert a rearward pull on the drawbar 35 which in turn will cause the fork 40 to swing clockwise as seen in Figure 1 about its pivot 39 against the action of the spring 42 which bears against the upper end of the fork 40. The spring 42 is properly tensioned so that the upper end of the fork 40 will be so positioned that the pin 44 will be spaced from the ends of the slot 45 under normal operating conditions. Thus, it will be readily apparent that if the implements 34 commence to move through hard tightly packed soil the draft on the drawbar 35 will be increased and the fork 40 will swing further in a clockwise direction thus displacing the pin 44 forwardly or from left to right as seen in Figure 1. When this occurs, the slotted link end 48 will move upwardly and forwardly permitting the control member 12 to turn clockwise about its pivot 50 as seen in Figure 1, thus supplying additional hydraulic medium under pressure to the ram cylinder 22 for raising the implements 34 to thus reduce the depth of penetration of said implements into the ground. On the other hand, if the implements 34 move into soft ground so that the draft thereof diminishes, the spring 42 will cause the upper portion of the fork 40 to swing rearwardly or counterclockwise as seen in Figure 1 thereby moving the pin 44 and the link 46 rearwardly to exert a downward and rearward pull on the control member 12. The control member 12 will thus be turned counterclockwise as seen in Figure 1 to effect a lowering of the implements 34. Accordingly, it will be readily seen that the depth of operation of the implements 34 will vary substantially without a change in the setting of the manually operated lever 16, where the implements 34 are traveling through different type soils. As this result is obviously undesirable since it causes the implements 34 to operate either deeper than necessary or shallower than is desired, when operating in various types of soils, the present invention is provided as an attachment to obviate this objectionable feature of the system 8.

The attachment 7 comprises a rod 52, as best seen in Figures 2 and 3, which has a threaded end 53. The rod end 53 extends threadedly through a plate 54 which is disposed against the outer side of the wall 38, below the slot 45, and through a threaded opening 55 of said wall 38, which is disposed between the pivot pin 39 and the slot 45. The threaded rod portion 53 carries a washer 56 which is disposed between the outer side of the plate 54 and a nut 57, which is threaded on the rod portion 53 and which is tightened against the washer 56 for securing the rod 52 in a desired adjusted position relative to the wall 38. The rod 52 at its outer end has an upwardly extending arm 58 which is fixed thereto and which may be positioned at a desired angle by adjustment of the rod 52 relative to the wall 38.

A lever arm 59 is provided near its lower end with a pin 60 which projects from an outer side thereof and which turnably engages in an opening 61 in the upper or outer portion of the arm 58, and which is held in engagement with said arm 58 by a cotter pin or the like 62 which extends therethrough.

The control attachment 7 also includes an elongated adjustable link, designated generally 63, including a rear section 64 and a forward section 65. The rear section 64 includes a tubular forward portion 66 having a threaded bore portion 67. The forward link section 65 comprises a rod having a threaded rear end 68 which threadedly engages in the bore portion 67 and by means of which the link sections 64 and 65 may be adjustably connected for varying the length of the link. A jamb nut 69 is carried by the threaded rod portion 68 and abuts against the forward end of the tubular portion 66 to retain the link sections in different adjusted positions. The rod 65 has a laterally turned forward end portion 70 forming a pivot element which extends through and turnably engages in an opening 71 in the upper part of the arm 59. The linkage part 70 is retained in engagement with the arm 59 by a cotter pin or the like 72, which extends therethrough. The rear link section 64 has a flattened rear end 73 provided with an opening 74 which loosely engages the pivot element 25, which connects the rod 24 to the bell crank arm 26. The arm 59 has a fixed pin 75 extending laterally from one side thereof, preferably toward the wall 38 and which is disposed between the pin 60 and opening 71 and preferably nearer the pin 60.

The attachment 7 assembled with the unit 8, as aforedescribed, is inoperative and will not affect the function of the unit 8 in its conventional manner as previously described. However, if it is desired to have the implements 34 operate at a uniform depth as set by manual operation of the lever 16 irrespective of the hardness of the soil through which said implements are moving, the attachment 7 can be rendered operative for accomplishing this result by merely disengaging the link opening 47 from the fork pin 44 and engaging it on the pin 75. A cotter pin or the like 76 may be provided through the pin 75 for retaining the link 46 pivotally connected to said pin. After this simple adjustment has been accomplished, the pump arm 11 may be swung downwardly as previously described by operation of the lever 16 for lowering the implements 34. As the bell crank arm 26 will swing forwardly or counterclockwise as seen in Figure 1 when the implements 34 are lowered, the link 46 will thus be permitted to move forwardly and upwardly, since the attachment link 63 will be displaced forwardly and will cause the attachment arm 59 to swing forwardly or clockwise about its pivot pin 60, as seen in Figure 1. This will permit the control member 12 to turn clockwise to a certain extent as seen in Figure 1 to effect a setting of the depth of the implements 34.

However, it will be apparent that when the tractor 10 is moving from left to right and irrespective of the draft or pull on the drawbar 35, no movement of the link 46 will result and consequently the implements 34 will operate at a uniform depth irrespective of the type of soil encountered.

The setting of the control member 12 by downward movement of the pump arm 11 can be varied by extending or retracting the link 63 to thus vary the extent of movement of the parts 11 and 12 relative to the movement of the manually actuated lever 16.

Various modifications and changes are contemplated and may obviously be resorted to, without departing from the spirit or scope of the invention as hereinafter defined by the appended claims.

I claim as my invention:

1. The combination with a hydraulic system for regulating the depth of operation of a ground engaging implement propelled by a tractor, including a lift unit swingably mounted on the tractor and having a swingably supported implement carrying part, a hydraulic ram means connected to the tractor and lift unit for raising and lowering said implement carrying part and an implement carried thereby, a hydraulic pump carried by the tractor and connected to said ram means, pump actuating means including a manually actuated part operable to effect actuation of the pump for raising and lowering said implement carrying part, said pump including a swingably mounted control member urged to swing in one direction for effecting a raising of said implement carrying part, draft means connected to said implement carrying part below the axis of swinging movement of said carrying part, and a link element connecting said draft means to said control member for regulating the depth of operation of the implement in accordance with the draft thereon, said link element having a forward end connected to said control member and a rear end detachably connected to a part of the draft means; of a control attachment comprising an elongated link member having a rear end pivotally connected to the connection of the ram means and said lift unit, an arm having an upper end pivotally connected to the opposite forward end of said link member, a fixed support connected to a structural part of the hydraulic system and on which the lower end of said arm is pivotally mounted for swinging movement longitudinally of the tractor, and said arm having a pivot element spaced from the ends thereof, the rear end of said link element being selectively disconnectible from said part of the draft means and connectible with said pivot element for regulating movement of the control member of the pump solely in response to movement of the connected parts of the ram means and lift unit.

2. A control attachment as in claim 1, said link member including means for varying the length thereof for varying spacing between the upper end of the control attachment arm and the connection of the ram means and lift unit.

3. A control attachment as in claim 1, said support for the arm being adjustably mounted for varying the spacing between the pivotally mounted lower end of said arm and the control member of the valve.

4. An attachment as in claim 1, said arm having a pin projecting laterally from the lower end thereof and pivotally connecting said arm to the attachment support, and a second pin projecting laterally from the arm between the ends thereof and on which the rear end of the link element of the draft means is detachably mounted.

5. The combination with a hydraulic system for raising and lowering a ground engaging implement propelled by a tractor, including a hydraulic pump for supplying a medium under pressure for raising and lowering the ground engaging implement, means including a manually actuated part for effecting an operation of the pump for raising and lowering the implement and for effecting a draft setting thereof, a swingably mounted control member forming a part of the pump and urged to swing in one direction for effecting an operation of the pump to raise the ground engaging implement, draft means connected to said ground engaging implement, a link element connecting the draft means and said control member whereby movement of the control member is regulated by the draft of the ground engaging implement for regulating the depth of operation of said implement, said link element having a forward end connected to said control member and a rear end connected to a part of the draft means; of a control attachment for use with said hydraulic system comprising a support connected to and supported by a part of the apparatus of said hydraulic system, an arm having a lower end pivotally mounted on said support for forward and rearward swinging movement toward and away from said control member, respectively, a link member having a forward end pivotally connected to an upper free end of said arm, said link member having a rear end pivotally connected to a part of said hydraulic system and which is movable toward and away from the pump in response to operation of the pump for lowering and raising, respectively, the ground engaging implement, and said arm having a connecting means spaced from the ends thereof, the rear end of said link element being selectively disconnectible from said part of the draft means and connectible with said connecting means when detached from said other part of the draft connection, for regulating operation of the control member solely in response to the raising and lowering of the ground engaging implement.

References Cited in the file of this patent

UNITED STATES PATENTS

| 2,611,307 | Strehlow et al. | Sept. 23, 1952 |
| 2,631,515 | McRae | Mar. 17, 1953 |
| 2,679,199 | Strehlow | May 25, 1954 |
| 2,721,508 | Edman | Oct. 25, 1955 |
| 2,722,874 | Bopf | Nov. 8, 1955 |

FOREIGN PATENTS

| 1,075,023 | France | Apr. 7, 1954 |